(12) United States Patent
Kim et al.

(10) Patent No.: US 11,734,167 B2
(45) Date of Patent: Aug. 22, 2023

(54) STORAGE DEVICE AND METHOD FOR UPDATING META SLICE INCLUDING MAP CHUNKS STORED IN NONVOLATILE MEMORY DEVICE ACCORDING TO JOURNAL ENTRIES

(71) Applicant: SK hynix Inc., Gyeonggi-do (KR)

(72) Inventors: Ju Hyun Kim, Gyeonggi-do (KR); Jin Yeong Kim, Gyeonggi-do (KR); Jae Wan Yeon, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 64 days.

(21) Appl. No.: 17/226,553

(22) Filed: Apr. 9, 2021

(65) Prior Publication Data

US 2022/0114087 A1    Apr. 14, 2022

(30) Foreign Application Priority Data

Oct. 13, 2020    (KR) .......................... 10-2020-0132229

(51) Int. Cl.
*G06F 12/02*    (2006.01)
*G06F 12/06*    (2006.01)
*G06F 13/16*    (2006.01)
*G06F 12/0831*    (2016.01)

(52) U.S. Cl.
CPC ........ *G06F 12/0238* (2013.01); *G06F 12/063* (2013.01); *G06F 12/0833* (2013.01); *G06F 13/1673* (2013.01); *G06F 2212/7201* (2013.01); *G06F 2212/7203* (2013.01)

(58) Field of Classification Search
None
See application file for complete search history.

(56) References Cited

U.S. PATENT DOCUMENTS

| | | | |
|---|---|---|---|
| 9,952,781 B2* | 4/2018 | Orme ................. | G06F 12/0238 |
| 2018/0239701 A1* | 8/2018 | Baptist ............... | G06F 11/1076 |
| 2019/0057038 A1* | 2/2019 | Haswell ............. | G06F 12/0875 |
| 2019/0114272 A1* | 4/2019 | Dubey ............... | G06F 12/0246 |
| 2019/0146911 A1* | 5/2019 | Ha ...................... | G06F 11/1068 |
| | | | 711/103 |
| 2021/0382828 A1* | 12/2021 | Li ....................... | G06F 12/1009 |

FOREIGN PATENT DOCUMENTS

| | | |
|---|---|---|
| KR | 10-1155542 | 6/2012 |
| KR | 10-2019-0054974 | 5/2019 |
| KR | 10-2020-0077276 | 6/2020 |

* cited by examiner

*Primary Examiner* — Tracy C Chan
(74) *Attorney, Agent, or Firm* — IP & T Group LLP

(57) ABSTRACT

The present technology relates to an electronic device. According to the present technology, a storage device that manages map data using a volatile memory device having a limited capacity may include a nonvolatile memory device, a memory controller, and the volatile memory device which includes a map chunk buffer, a map chunk status table, a journal buffer, and a meta slice buffer.

20 Claims, 15 Drawing Sheets

STORAGE DEVICE AND METHOD FOR UPDATING META SLICE INCLUDING MAP CHUNKS STORED IN NONVOLATILE MEMORY DEVICE ACCORDING TO JOURNAL ENTRIES

CROSS-REFERENCE TO RELATED APPLICATION

The present application claims priority under 35 U.S.C. § 119(a) to Korean patent application number 10-2020-0132229, filed on Oct. 13, 2020, which is incorporated herein by reference in its entirety.

BACKGROUND

Field of Invention

The present disclosure relates to an electronic device, and more particularly, to a storage device and a method of operating the same.

Description of Related Art

A storage device is a device that stores data under control of a host device such as a computer or a smartphone. A storage device may include a memory device storing data and a memory controller controlling the memory device. The memory device may be classified into a volatile memory device and a nonvolatile memory device.

The volatile memory device may be a device that stores data only when power is supplied and loses the stored data when the power supply is cut off. The volatile memory device may include a static random access memory (SRAM), a dynamic random access memory (DRAM), and the like.

The nonvolatile memory device is a device that does not lose data even though power is cut off. The nonvolatile memory device includes a read only memory (ROM), a programmable ROM (PROM), an electrically programmable ROM (EPROM), an electrically erasable and programmable ROM (EEPROM), a flash memory, and the like.

SUMMARY

An embodiment of the present disclosure provides a storage device that manages map data using a volatile memory device having a limited capacity, and a method of operating the same.

According to an embodiment of the present disclosure, a storage device may include a nonvolatile memory device configured to store a plurality of map chunks including map data having logical addresses provided by a host and physical addresses indicating a position where data corresponding to the logical addresses is stored; a volatile memory device including a map chunk buffer that temporarily stores some of the plurality of map chunks, and a map chunk status table that stores map chunk status information indicating whether each of the plurality of map chunks stored in the nonvolatile memory device is temporarily stored in the map chunk buffer; and a memory controller configured to control the nonvolatile memory device and the volatile memory device to load a map chunk in which a write-requested logical address is included in the map chunk buffer among the plurality of map chunks stored in the nonvolatile memory device, and to store the map chunk status information indicating that the map chunk in which the write-requested logical address is included is loaded in the map chunk buffer, in response to a write request input from the host.

According to an embodiment of the present disclosure, a storage device may include a nonvolatile memory device configured to store a plurality of map chunks including map data having logical addresses provided by a host and physical addresses indicating a position where data corresponding to the logical addresses is stored; a map chunk buffer configured to temporarily store some of the plurality of map chunks stored in the nonvolatile memory device; a map chunk status table configured to store map chunk status information indicating whether each of the plurality of map chunks stored in the nonvolatile memory device is temporarily stored in the map chunk buffer; a journal buffer configured to store a journal entry including information on an updated map entry among the plurality of map entries included in the map chunk temporarily stored in the map chunk buffer; and a meta slice buffer configured to temporarily store a meta slice including map chunks of a dirty status among the plurality of map chunks stored in the nonvolatile memory device, wherein a number of journal entries to be stored in the journal buffer is the same as a number of map chunks to be stored in the map chunk buffer.

According to an embodiment of the present disclosure, a storage device may include a storage medium configured to store therein plural map chunks each including plural map entries; first to fourth memory media; and a controller configured to: load, onto the first memory medium, a requested map chunk corresponding to a requested logical address among the plural map chunks stored in the storage medium, selectively change the map entry corresponding to the requested logical address within the requested map chunk, generate, in the second memory media, first information of the requested map chunk according to the selective change of the map entry, generate, in the third memory media, second information of the changed map entry, load onto the fourth memory media, when the third memory media becomes full of the second information generated therein, at least a target map chunk among the plural map chunks stored in the storage medium by referring to the second information, reflect the changed map entry into the target map chunk by referring to the first information, and store, after the reflection, the target map chunk back to the storage medium.

According to the present technology, a storage device that manages map data using a volatile memory device having a limited capacity, and a method of operating the same are provided.

DETAILED DESCRIPTION

Specific structural or functional descriptions of embodiments which are disclosed in the present specification or application are illustrated only to describe the embodiments according to the present disclosure. The embodiments of the present disclosure may be carried out in various forms and the descriptions are not limited to the embodiments described in the present specification or application.

Figure 1:
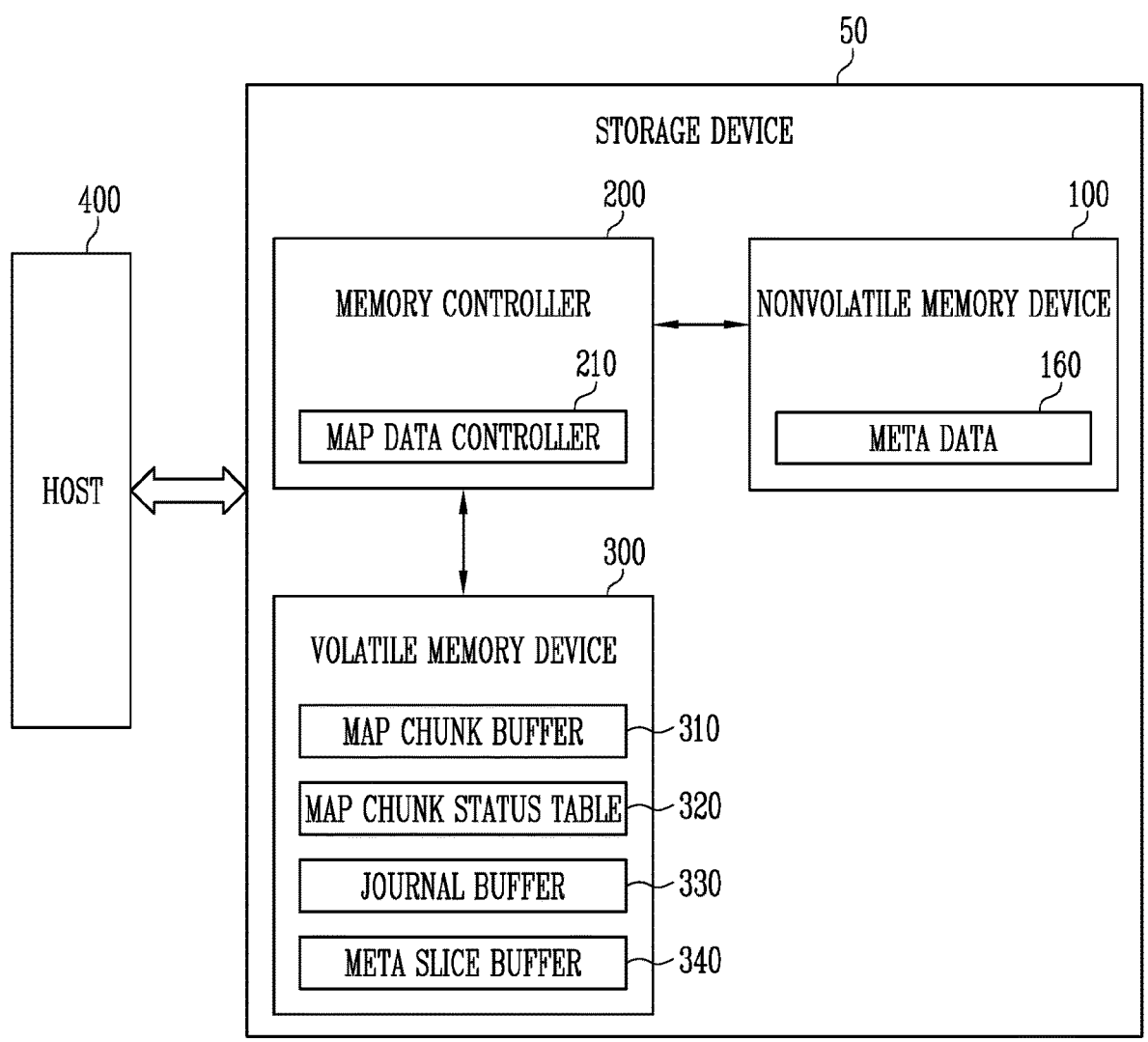
FIG. 1 is a diagram illustrating a storage device according to an embodiment of the present disclosure.

FIG. 1 is a diagram illustrating a storage device according to an embodiment of the present disclosure.

Referring to FIG. 1, the storage device 50 may include a nonvolatile memory device 100, a memory controller 200, and a volatile memory device 300. The storage device 50 may be a device that stores data under control of a host 400 such as a cellular phone, a smartphone, an MP3 player, a laptop computer, a desktop computer, a game player, a TV, a tablet PC, or an in-vehicle infotainment system. Alternatively, the storage device 50 may be a device that stores data under the control of the host 400 that stores high-capacity data in one place, such as a server or a data center.

The storage device 50 may be manufactured as one of various types of storage devices according to a host interface that is a communication method with the host 400. For example, the storage device 50 may be configured as any of various types of storage devices such as an SSD, a multimedia card in a form of an MMC, an eMMC, an RS-MMC and a micro-MMC, a secure digital card in a form of an SD, a mini-SD and a micro-SD, a universal serial bus (USB) storage device, a universal flash storage (UFS) device, a personal computer memory card international association (PCMCIA) card type storage device, a peripheral component interconnection (PCI) card type storage device, a PCI express (PCI-E) card type storage device, a compact flash (CF) card, a smart media card, and a memory stick.

The storage device 50 may be manufactured as any of various types of packages. For example, the storage device 50 may be manufactured as any of various types of package types, such as a package on package (POP), a system in package (SIP), a system on chip (SOC), a multi-chip package (MCP), a chip on board (COB), a wafer-level fabricated package (WFP), and a wafer-level stack package (WSP).

The nonvolatile memory device 100 may store data. The nonvolatile memory device 100 operates under control of the memory controller 200. The nonvolatile memory device 100 may include a memory cell array (not shown) including a plurality of memory cells that store data.

Each of the memory cells may be configured as a single level cell (SLC) that stores one data bit, a multi-level cell (MLC) that stores two data bits, a triple level cell (TLC) that stores three data bits, or a quad level cell (QLC) capable of storing four data bits.

The memory cell array (not shown) may include a plurality of memory blocks. Each memory block may include a plurality of memory cells. Each memory block may include a plurality of pages. In an embodiment, the page may be a unit for storing data in the nonvolatile memory device 100 or reading data stored in the nonvolatile memory device 100. The memory block may be a unit for erasing data.

In an embodiment, the nonvolatile memory device 100 may be a double data rate synchronous dynamic random access memory (DDR SDRAM), a low power double data rate4 (LPDDR4) SDRAM, a graphics double data rate (GDDR) SDRAM, a low power DDR (LPDDR), a Rambus dynamic random access memory (RDRAM), a NAND flash memory, a vertical NAND flash memory, a NOR flash memory, a resistive random access memory (RRAM), a phase-change random access memory (PRAM), a magnetoresistive random access memory (MRAM), a ferroelectric random access memory (FRAM), a spin transfer torque random access memory (STT-RAM), or the like. In the present specification, for convenience of description, the nonvolatile memory device 100 is a NAND flash memory.

The nonvolatile memory device 100 is configured to receive a command and an address from the memory controller 200 and access an area selected by the address in the memory cell array. The nonvolatile memory device 100 may perform an operation instructed by the command on the area selected by the address. For example, the nonvolatile memory device 100 may perform a write operation (program operation), a read operation, and an erase operation. During the program operation, the nonvolatile memory device 100 may program data in the area selected by the address. During the read operation, the nonvolatile memory device 100 may read data from the area selected by the address. During the erase operation, the nonvolatile memory device 100 may erase data stored in the area selected by the address.

The nonvolatile memory device 100 may store meta data 160. The meta data 160 may include map data including mapping information between a logical address provided by the host 400 and a physical address corresponding to the logical address. The map data may include a plurality of map chunks. One map chunk may include a plurality of map entries. One map entry may include mapping information of one logical address.

In an embodiment, the meta data 160 may further include information on a valid page included in the memory block, information on the number of times of erasure of each memory block, and information on the number of times of read of each memory block, in addition to the map data. Alternatively, the meta data 160 may include journal data that is information on an updated map entry among the map entries. The journal data may include a plurality of journal entries. One journal entry may include information on update of one map entry. For example, the journal entry may include information on a previous physical address and an updated physical address of the logical address.

In an embodiment, the meta data may be updated in a plurality of meta slice units. One meta slice may include a plurality of map chunks. The meta slice may be a unit in which the memory controller 200 stores updated map data in the nonvolatile memory device 100 or reads map chunks from the nonvolatile memory device 100.

The memory controller 200 may control an overall operation of the storage device 50.

When power is applied to the storage device 50, the memory controller 200 may execute firmware (FW). When the nonvolatile memory device 100 is a flash memory device, the memory controller 200 may execute firmware such as a flash translation layer (FTL) for controlling communication between the host 400 and the nonvolatile memory device 100.

In an embodiment, the memory controller 200 may receive data and a logical address (LA) from the host 400 and may convert the LA into a physical address (PA) indicating an address of memory cells in which data is to be stored included in the nonvolatile memory device 100.

The memory controller 200 may control the nonvolatile memory device 100 to perform the program operation, the read operation, or the erase operation according to a request of the host 400. During the program operation, the memory controller 200 may provide a program command, the PA, and data to the nonvolatile memory device 100. During the read operation, the memory controller 200 may provide a read command and the PA to the nonvolatile memory device 100. During the erase operation, the memory controller 200 may provide an erase command and the PA to the nonvolatile memory device 100.

In an embodiment, the memory controller 200 may generate a command, an address, and data independently regardless of the request from the host 400 and transmit the command, the address, and the data to the nonvolatile memory device 100. For example, the memory controller 200 may provide the command, the address, and the data for performing a program operation, a read operation and an erase operation accompanying the performing of wear leveling, read reclaim, garbage collection, and the like, to the nonvolatile memory device 100.

In an embodiment, the memory controller 200 may control at least two or more nonvolatile memory devices 100. In this case, the memory controller 200 may control the nonvolatile memory devices 100 according to an interleaving method to improve operation performance. The interleaving method may be a method of controlling operations for at least two nonvolatile memory devices 100 to overlap with each other.

The memory controller 200 may include a map data controller 210.

During the write operation, the map data controller 210 may allocate a physical address corresponding to a write-requested logical address. Data corresponding to the write-requested logical address may be stored in a position indicated by the allocated physical address within the nonvolatile memory device 100. The map data controller 210 may control a map update operation of storing map data including a mapping relationship between the write-requested logical address and the allocated physical address in the nonvolatile memory device 100.

During the read operation, the map data controller 210 may search for the map data included in the meta data 160 to obtain a physical address corresponding to a read-requested logical address. The map data controller 210 may load a map chunk including a map entry corresponding to the read-requested logical address among the map chunks included in the meta data 160 to the volatile memory device 300, and obtain the physical address corresponding to the read-requested logical address from the loaded map chunk. Thereafter, the memory controller 200 may control the nonvolatile memory device 100 to perform a read operation of reading data stored in the obtained physical address.

The volatile memory device 300 may include a map chunk buffer 310, a map chunk status table 320, a journal buffer 330, and a meta slice buffer 340. The volatile memory device 300 may be a dynamic random access memory (DRAM) or a static random access memory (SRAM).

The map chunk buffer 310 may be an area for temporarily storing some of the plurality of map chunks included in the meta data 160 stored in the nonvolatile memory device 100. A number of map chunks that can be stored in the map chunk buffer 310 may be determined in advance. The map chunk buffer 310 may provide a space for storing the map chunks so that the memory controller 200 may quickly find the map data related to the logical address corresponding to data requested to be written or read from the host during the write operation or the read operation.

The map chunk status table 320 may include map chunk status information of the plurality of map chunks stored in the nonvolatile memory device 100. The map chunk status information may be one of a dirty status (Loaded and Dirty) indicating that each of the map chunks is temporarily stored in the map chunk buffer 310 and includes an updated map entry, a clean status (Loaded and Clean) indicating that the map chunk is temporarily stored in the map chunk buffer 310 and does not include the updated map entry, and a non-stored status (Not Loaded) indicating that the map chunk is not temporarily stored in the map chunk buffer 310. In an embodiment, the map chunk status information may further include a physical address indicating a position where each of the map chunks is stored in the nonvolatile memory device 100.

The journal buffer 330 may store journal data. The journal data may store a plurality of journal entries. Each journal entry may include information on the updated map entry. For example, the journal entry may include information on a previous physical address, which is a physical address before update of the map entry corresponding to the logical address, and an updated physical address, which is a physical address after the update. Since the journal buffer 330 only includes information corresponding to an updated portion of the plurality of map chunks, the memory controller 200 may rebuild the map data of the latest status by using the journal entries stored in the journal buffer 330.

The meta slice buffer 340 may be an area for loading a meta slice including map chunks to be updated among a plurality of meta slices. The meta slice may be a unit in which the memory controller 200 stores the updated map data in the nonvolatile memory device 100 or reads the map chunks from the nonvolatile memory device 100.

The memory controller 200 may store the journal entries stored in the journal buffer 330 and the updated map chunks stored in the meta slice buffer 340 together in the nonvolatile memory device 100.

The host 400 may communicate with the storage device 50 using at least one of various communication methods such as a universal serial bus (USB), a serial AT attachment (SATA), a serial attached SCSI (SAS), a high speed interchip (HSIC), a small computer system interface (SCSI), a peripheral component interconnection (PCI), a PCI express (PCIe), a nonvolatile memory express (NVMe), a universal flash storage (UFS), a secure digital (SD), a multi-media card (MMC), an embedded MMC (eMMC), a dual in-line memory module (DIMM), a registered DIMM (RDIMM), and a load reduced DIMM (LRDIMM).

Figure 2:
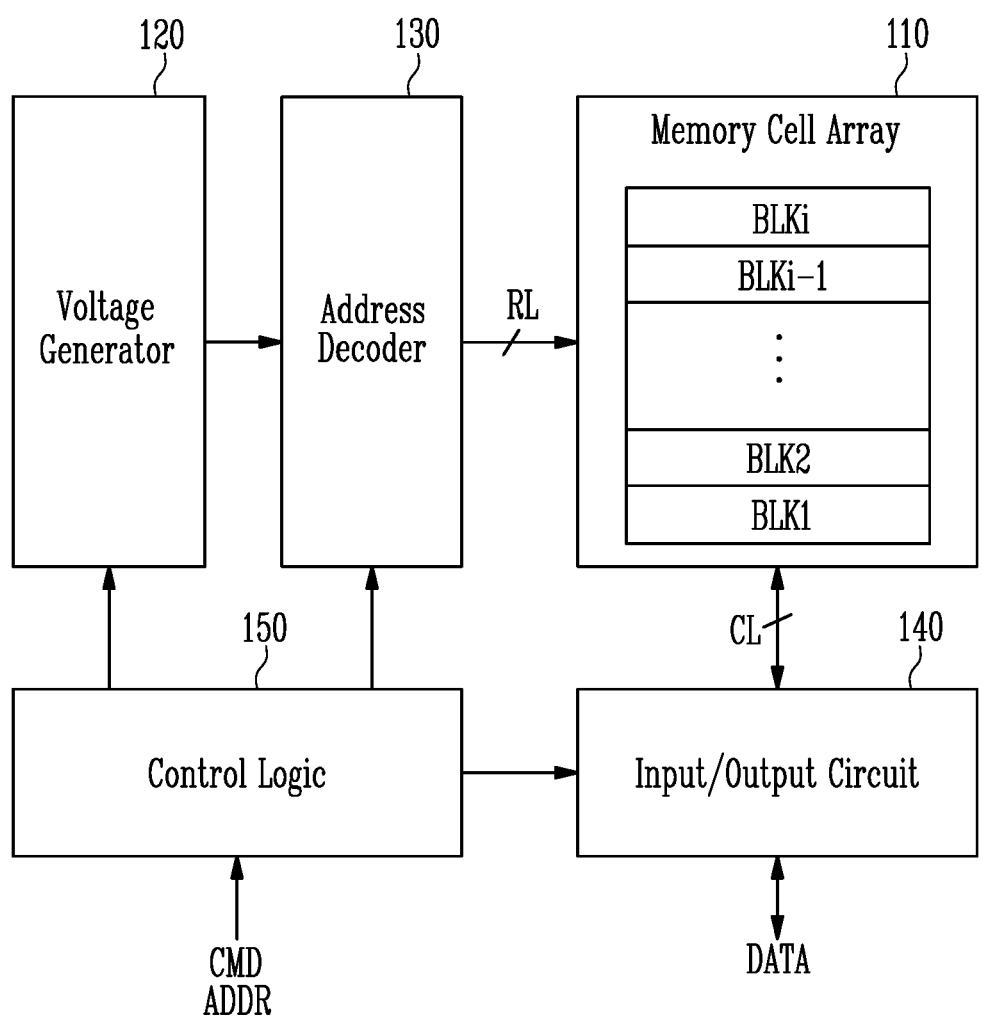
FIG. 2 is a diagram illustrating a memory device of FIG. 1.

FIG. 2 is a diagram illustrating the memory device of FIG. 1.

Referring to FIG. 2, the nonvolatile memory device 100 may include a memory cell array 110, a voltage generator 120, an address decoder 130, an input/output circuit 140, and a control logic 150.

The memory cell array 110 includes a plurality of memory blocks BLK1 to BLKi. The plurality of memory blocks BLK1 to BLKi are connected to the address decoder 130 through row lines RL. The plurality of memory blocks BLK1 to BLKi may be connected to the input/output circuit 140 through column lines CL. In an embodiment, the row lines RL may include word lines, source select lines, and drain select lines. In an embodiment, the column lines CL may include bit lines.

Each of the plurality of memory blocks BLK1 to BLKi includes a plurality of memory cells. In an embodiment, the plurality of memory cells may be nonvolatile memory cells. Memory cells connected to the same word line among the plurality of memory cells may be defined as one physical page. That is, the memory cell array 110 may include a plurality of physical pages. Each of the memory cells of the nonvolatile memory device 100 may be configured as an SLC that stores one data bit, an MLC that stores two data bits, a TLC that stores three data bits, or a QLC capable of storing four data bits.

Some of the plurality of memory blocks BLK1 to BLKi may be map data blocks that store the map data described with reference to FIG. 1. The remaining of the plurality of memory blocks BLK1 to BLKi may be normal blocks that store data requested by the host 400.

In an embodiment, the voltage generator 120, the address decoder 130, and the input/output circuit 140 may be collectively referred to as a peripheral circuit. The peripheral circuit may drive the memory cell array 110 under control of the control logic 150. The peripheral circuit may drive the memory cell array 110 to perform the program operation, the read operation, and the erase operation.

The voltage generator 120 is configured to generate a plurality of operation voltages using an external power voltage supplied to the nonvolatile memory device 100. The voltage generator 120 operates in response to the control of the control logic 150.

In an embodiment, the voltage generator 120 may generate an internal power voltage by regulating the external power voltage. The internal power voltage generated by the voltage generator 120 is used as an operation voltage of the nonvolatile memory device 100.

In an embodiment, the voltage generator 120 may generate the plurality of operation voltages using an external power voltage or an internal power voltage. The voltage generator 120 may be configured to generate various voltages required in the nonvolatile memory device 100. For example, the voltage generator 120 may generate a plurality of erase voltages, a plurality of program voltages, a plurality of pass voltages, a plurality of selected read voltages, and a plurality of unselected read voltages.

The voltage generator 120 may include a plurality of pumping capacitors that receive the internal power voltage to generate the plurality of operation voltages having various voltage levels, and may generate the plurality of operation voltages by selectively activating the plurality of pumping capacitors in response to the control of the control logic 150.

The generated plurality of operation voltages may be supplied to the memory cell array 110 by the address decoder 130.

The address decoder 130 is connected to the memory cell array 110 through the row lines RL. The address decoder 130 is configured to operate in response to the control of the control logic 150. The address decoder 130 may receive an address ADDR from the control logic 150. The address decoder 130 may decode a block address among the received addresses ADDR. The address decoder 130 selects at least one memory block among the memory blocks BLK1 to BLKi according to the decoded block address. The address decoder 130 may decode a row address among the received addresses ADDR. The address decoder 130 may select at least one word line among word lines of a selected memory block according to the decoded row address. In an embodiment, the address decoder 130 may decode a column address among the received addresses ADDR. The address decoder 130 may connect the input/output circuit 140 and the memory cell array 110 to each other according to the decoded column address.

For example, the address decoder 130 may include components such as a row decoder, a column decoder, and an address buffer.

The input/output circuit 140 may include a plurality of page buffers. The plurality of page buffers may be connected to the memory cell array 110 through the bit lines. During the program operation, data may be stored in selected memory cells according to data stored in the plurality of page buffers.

During the read operation, the data stored in the selected memory cells may be sensed through the bit lines, and the sensed data may be stored in the page buffers.

The control logic 150 may control the address decoder 130, the voltage generator 120, and the input/output circuit 140. The control logic 150 may operate in response to the command CMD transmitted from an external device. The control logic 150 may generate control signals in response to the command CMD and the address ADDR to control the peripheral circuits.

Figure 3:
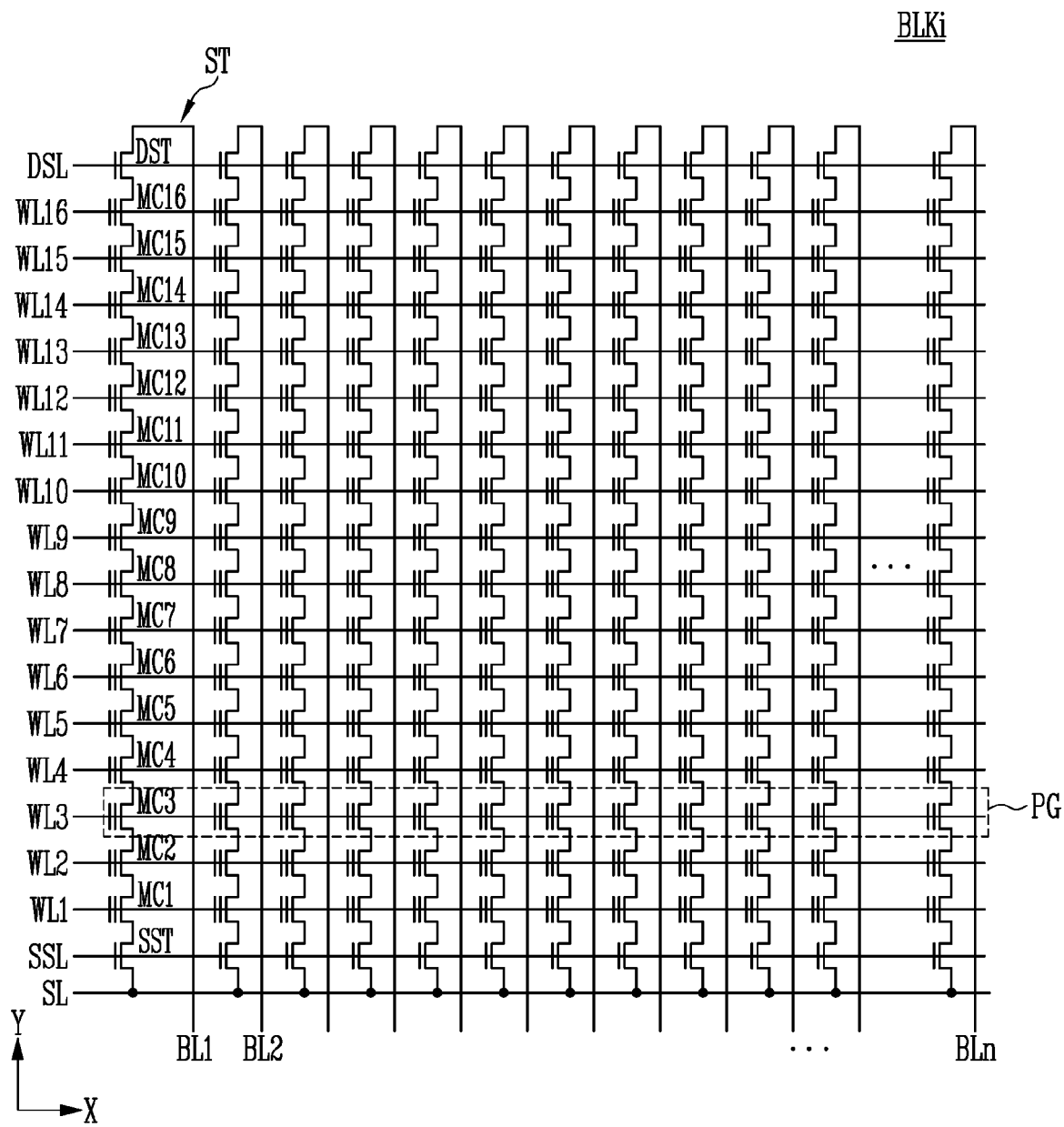
FIG. 3 is a diagram illustrating a structure of one of the memory blocks of FIG. 2.

FIG. 3 is a diagram illustrating a configuration of one of the memory blocks of FIG. 2.

The memory block BLKi is one memory block BLKi among the memory blocks BLK1 to BLKi of FIG. 2.

Referring to FIG. 3, a plurality of word lines arranged in parallel with each other may be connected between a first select line and a second select line. Here, the first select line may be the source select line SSL, and the second select line may be the drain select line DSL. More specifically, the memory block BLKi may include a plurality of strings ST connected between the bit lines BL1 to BLn and a source line SL. The bit lines BL1 to BLn may be connected to the strings ST, respectively, and the source line SL may be commonly connected to the strings ST. Since the strings ST may be configured to be identical to each other, a string ST connected to the first bit line BL1 is specifically described, as an example.

The string ST may include a source select transistor SST, a plurality of memory cells MC1 to MC16, and a drain select transistor DST connected in series between the source line SL and the first bit line BL1. One string ST may include at least one or more of the source select transistor SST and the drain select transistor DST, and may include the memory cells MC1 to MC16 or more memory cells than the number shown in the figure.

A source of the source select transistor SST may be connected to the source line SL and a drain of the drain select transistor DST may be connected to the first bit line BL1. The memory cells MC1 to MC16 may be connected in series between the source select transistor SST and the drain select transistor DST. Gates of the source select transistors SST included in the different strings ST may be connected to the source select line SSL, gates of the drain select transistors DST may be connected to the drain select line DSL, and gates of the memory cells MC1 to MC16 may be connected to the plurality of word lines WL1 to WL16. A group of the memory cells connected to the same word line among the memory cells included in different strings ST may be referred to as a page PG. Therefore, the memory block BLKi may include a number of pages PG corresponding to the number of the word lines WL1 to WL16.

One memory cell may store one bit of data. This is commonly called a single level cell (SLC). In this case, one physical page PG may store one logical page (LPG) data. The one logical page (LPG) data may include data bits having the same number as cells included in one physical page PG.

The one memory cell may store two or more bits of data. In this case, one physical page PG may store two or more logical page (LPG) data.

Figure 4:
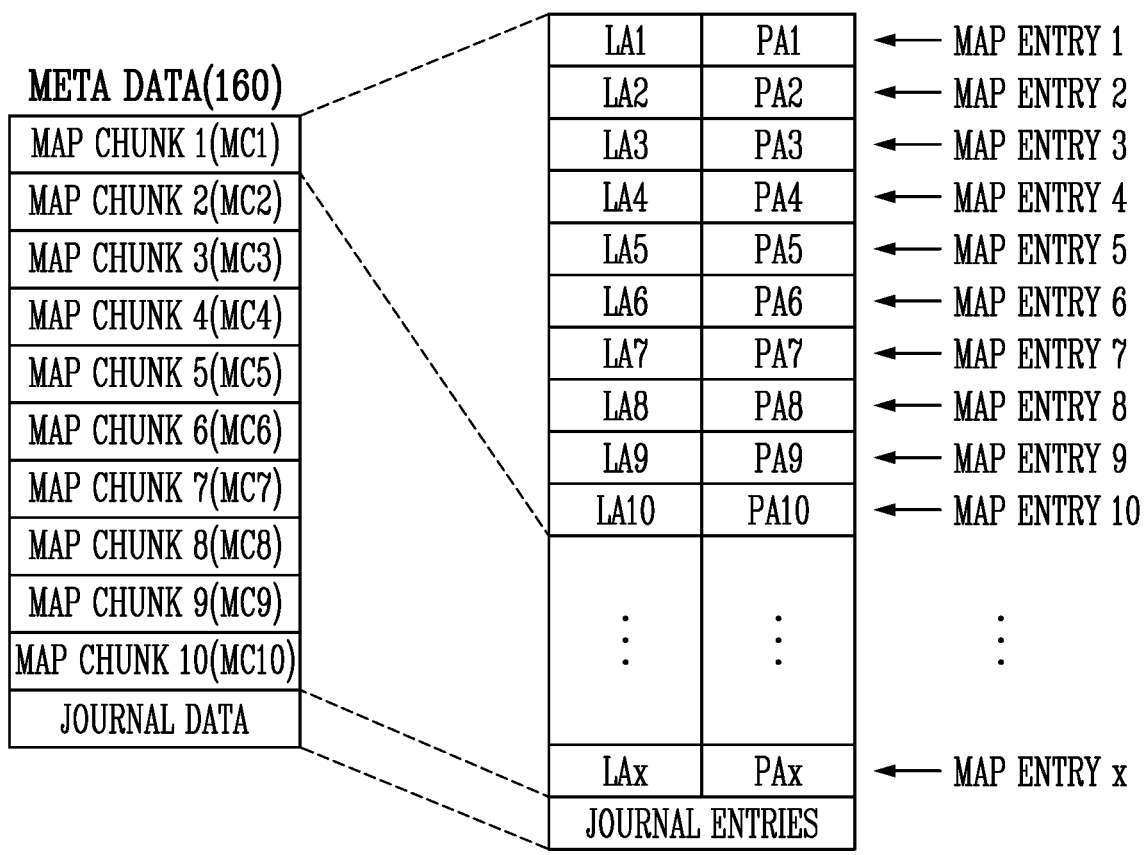
FIG. 4 is a diagram illustrating meta data of FIG. 1.

FIG. 4 is a diagram illustrating the meta data of FIG. 1.

Referring to FIG. 4, the meta data 160 may include the map data including the mapping information between the logical address provided by the host 400 and the physical address corresponding to the logical address. The map data may include a plurality of map chunks. One map chunk may include a plurality of map entries. One map entry may include mapping information of one logical address.

In FIG. 4, the nonvolatile memory device 100 stores 10 map chunks MC1 to MC10.

Each of the map chunk 1 MC1 to the map chunk 10 MC10 includes a plurality of map entries. In the present specification, one map chunk includes 10 map entries.

For example, the map chunk 1 MC1 may include a map entry 1 to a map entry 10. The map chunk 2 MC2 may include a map entry 11 to a map entry 20. In an embodiment, although not shown in the drawing, the meta data 160 may further include information on a valid page included in the memory block, information on the number of times of an erasure of each memory block, and information on the number of times of a read of each memory block, in addition to the map data.

In an embodiment, the meta data 160 may include journal data that is information on the updated map entry among the map entries. The journal data may include a plurality of journal entries. One journal entry may include information on an update of one map entry. For example, the journal entry may include information on a physical address (previous physical address) before update of the map entry corresponding to the logical address and a physical address (updated physical address) after the update of the map entry corresponding to the logical address.

In an embodiment, the meta data may be divided into a plurality of meta slices. In an embodiment, the meta slice may be a unit for updating the meta data. One meta slice may include a plurality of map chunks. The meta slice may be a unit in which the memory controller 200 stores the updated map data in the nonvolatile memory device 100 or reads the map chunks from the nonvolatile memory device 100.

Figure 5:
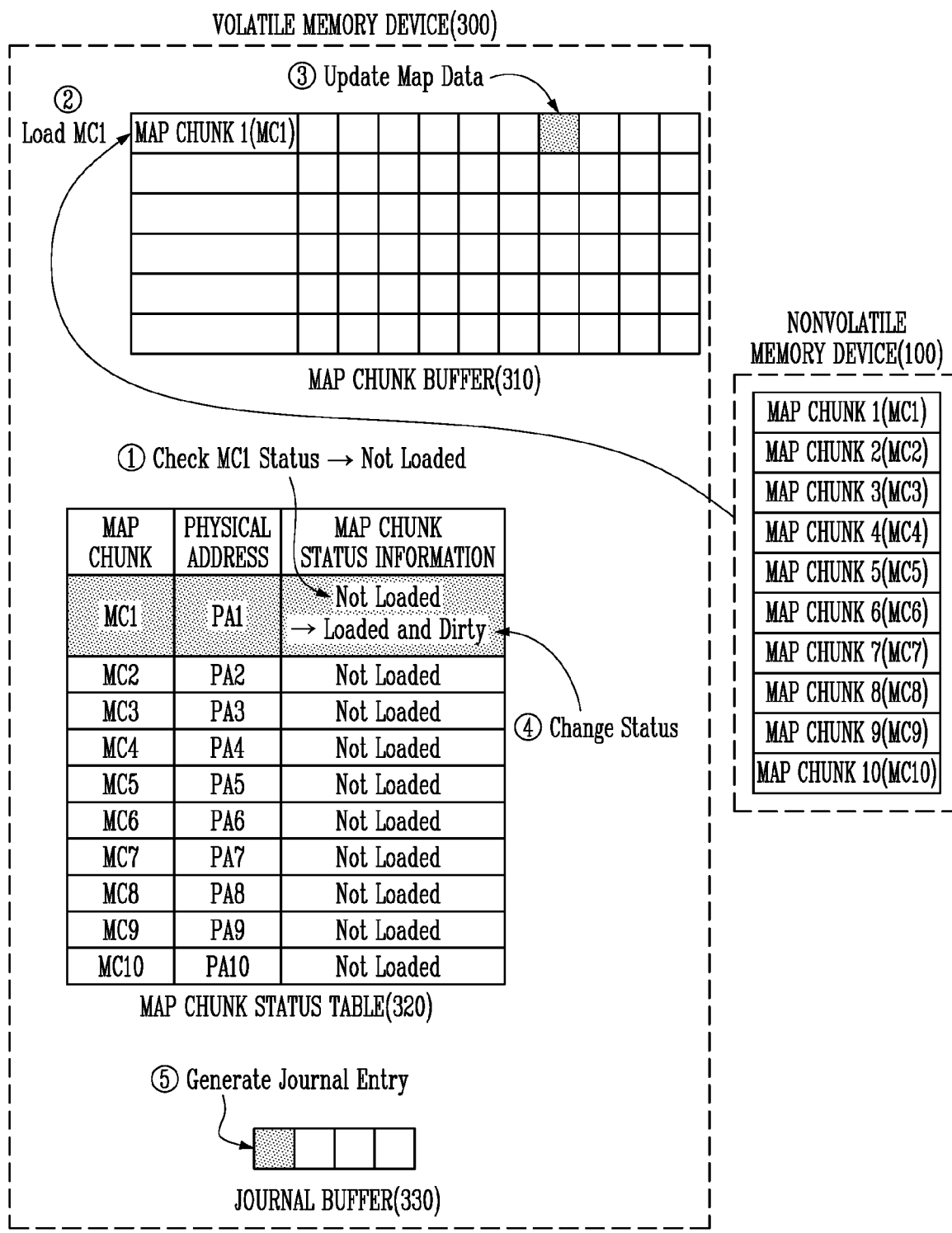
FIG. 5 is a diagram illustrating a write operation of a storage device according to an embodiment of the present disclosure.

FIG. 5 is a diagram illustrating a write operation of a storage device according to an embodiment of the present disclosure.

Referring to FIGS. 1, 4 and 5, the memory controller 200 may receive a write request from the host. In the embodiment of FIG. 5, the write-requested logical address is a seventh logical address LA7. The memory controller 200 may allocate a physical address corresponding to the seventh logical address LA7. In order to update map data corresponding to the seventh logical address LA7, the memory controller 200 may determine whether the map chunk 1 MC1 to which a map entry corresponding to the seventh logical address LA7 belongs is loaded in the map chunk buffer 310.

The memory controller 200 may check the map chunk status table 320 and confirm that the map chunk 1 MC1 is in the non-stored status (Not Loaded) (① Check MC1 Status→Not Loaded).

The memory controller 200 may load the map chunk 1 MC1 among the plurality of map chunks MC1 to MC10 stored in the nonvolatile memory device 100 in the map chunk buffer 310 (② Load MC1).

The memory controller 200 may update the map entry corresponding to the seventh logical address LA7 included in the map chunk 1 MC1 loaded in the map chunk buffer 310 (③ Update Map Data). Specifically, the memory controller 200 may correct the physical address before the update on the map entry to the updated physical address.

The memory controller 200 may change the status of the map chunk 1 MC1 of the map chunk status table 320 from the non-stored status (Not Loaded) to the dirty status (Loaded and Dirty) (④ Change Status).

The memory controller 200 may generate a journal entry including information on the updated map entry (⑤ Generate Journal Entry). The journal entry may include information on a previous physical address, which is a physical address included in the map entry corresponding to the seventh logical address LA7 included in the map chunk 1 MC1 loaded in the map chunk buffer 310 before the update (③) of the map entry corresponding to the seventh logical address LA7, and an updated physical address, which is a physical address after the update (③).

The memory controller 200 may store the generated journal entry in the journal buffer 330.

Figure 6:
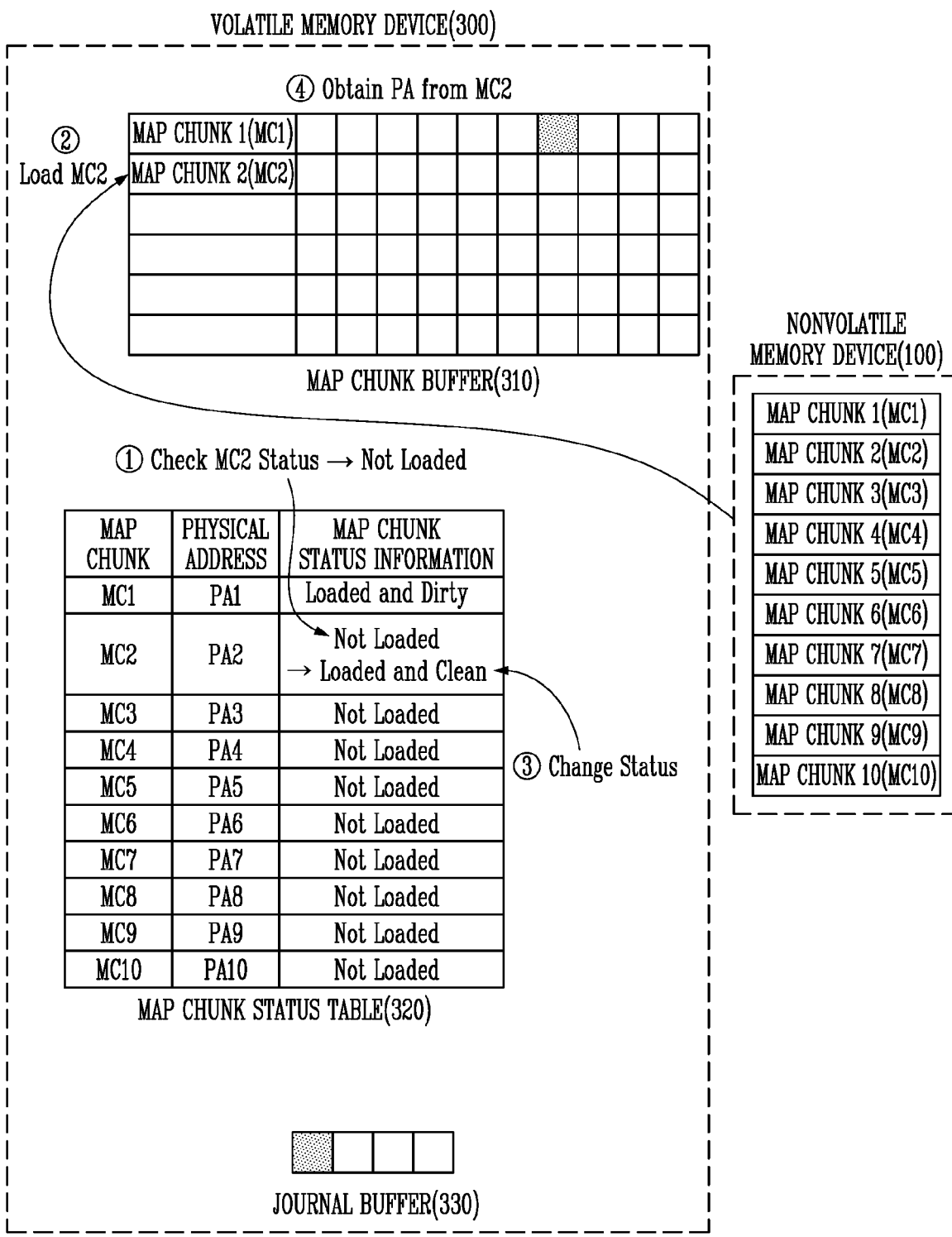
FIG. 6 is a diagram illustrating a read operation of a storage device according to an embodiment of the present disclosure.

FIG. 6 is a diagram illustrating a read operation of a storage device according to an embodiment of the present disclosure.

Referring to FIGS. 1, 4, 5 and 6, the memory controller 200 may receive a read request from the host. In the embodiment of FIG. 6, a read-requested logical address corresponds to a map entry included in the map chunk 2 MC2.

The memory controller 200 may check the map chunk status table 320 and confirm that the map chunk 2 MC2 is in the non-stored status (Not Loaded) (① Check MC2 Status→Not Loaded).

The memory controller 200 may load the map chunk 2 MC2 among the plurality of map chunks MC1 to MC10 stored in the nonvolatile memory device 100 to the map chunk buffer 310 (② Load MC2).

The memory controller 200 may change the status of the map chunk 2 MC2 of the map chunk status table 320 from the non-stored status (Not Loaded) to the clean status (Loaded and Clean) (③ Change Status).

The memory controller 200 may obtain a physical address corresponding to the read-requested logical address from the map chunk 2 MC2 temporarily stored in the map chunk buffer 310 (④ Obtain PA from MC2).

Figure 7:
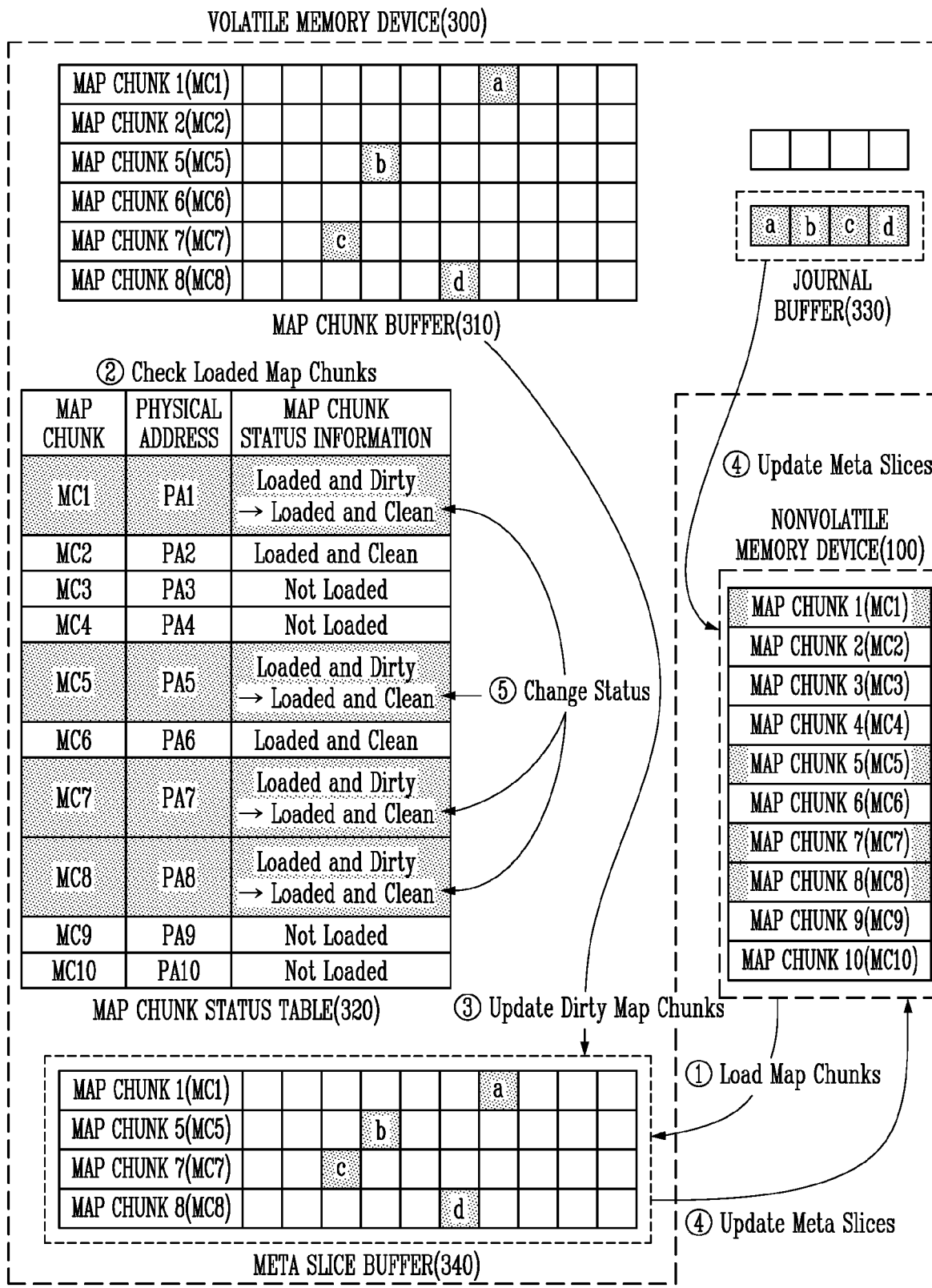
FIG. 7 is a diagram illustrating a map update operation of a storage device according to an embodiment of the present disclosure.

FIG. 7 is a diagram illustrating a map update operation of a storage device according to an embodiment of the present disclosure.

Referring to FIGS. 1 and 7, six map chunks are loaded in the map chunk buffer 310. Specifically, the map chunk 1 MC1, the map chunk 2 MC2, the map chunk 5 MC5, the map chunk 6 MC6, the map chunk 7 MC7, and the map chunk 8 MC8 may be loaded in the map chunk buffer 310.

Among the map chunks loaded in the map chunk buffer 310, the map chunk 1 MC1, the map chunk 5 MC5, the map chunk 7 MC7, and the map chunk 8 MC8 may be in the dirty status (Loaded and Dirty).

Among the map chunks loaded in the map chunk buffer 310, the map chunk 2 MC2 and the map chunk 6 MC6 may be in the clean status (Loaded and Clean).

An embodiment in which the map chunk 1 MC1, the map chunk 5 MC5, the map chunk 7 MC7, and the map chunk 8 MC8 are in the dirty status (Loaded and Dirty) may indicate that each of the map chunk 1 MC1, the map chunk 5 MC5, the map chunk 7 MC7, and the map chunk 8 MC8 includes at least one or more updated map entries. Specifically, a seventh logical address "a" of the map chunk 1 MC1, a fifty-fourth logical address "b" of the map chunk 5 MC5, a seventy-third logical address "c" of the map chunk 7 MC7, and an eighty-sixth logical address "d" of the map chunk 8 MC8 may be in an updated state.

Since the map entry is updated, the seventh logical address "a" of the map chunk 1 MC1, the fifty-fourth logical address "b" of the map chunk 5 MC5, the seventy-third logical address "c" of the map chunk 7 MC7, and the eighty-sixth logical address "d" of the map chunk 8 MC8 may be in a stored state.

The map update operation may be performed when the number of journal entries stored in the journal buffer 330 reaches a preset number.

The memory controller 200 may obtain, from the nonvolatile memory device 100, the map chunks in the dirty status (Loaded and Dirty) among the map chunks loaded in the map chunk buffer 310 by referring to the journal entries stored in the journal buffer 330 and load the obtained map chunks in the meta slice buffer 340 (① Load Map Chunks). The memory controller 200 may check the map chunk status information of the loaded map chunks (② Check Loaded Map Chunks), and may update the map chunks loaded in the meta slice buffer 340 by using the map chunk buffer 310 in which the map chunks in the loaded and dirty status (Loaded and Dirty) are stored (③ Update Dirty Map Chunks).

Thereafter, the memory controller 200 may perform a flush operation of storing the updated map chunks, which are stored in the meta slice buffer 340, and the journal data, which is stored in the journal buffer 330, in the nonvolatile memory device 100 (④ Update Meta Slices). Thereafter, the memory controller 200 may change the status of the updated map chunks of the map chunk status table 320 from the dirty status (Loaded and Dirty) to the clean status (Loaded and Clean) (⑤ Change Status).

According to an embodiment of the present disclosure, the memory controller 200 may maintain a 1:1 status of the number of map chunks in the dirty status (Loaded and Dirty) and the number of generated journals. Through this, even though a capacity of the volatile memory device 300 is insufficient, the memory controller 200 may implement an ultra-high capacity SSD by using the existing 4K mapping method and journaling method.

Figure 8:
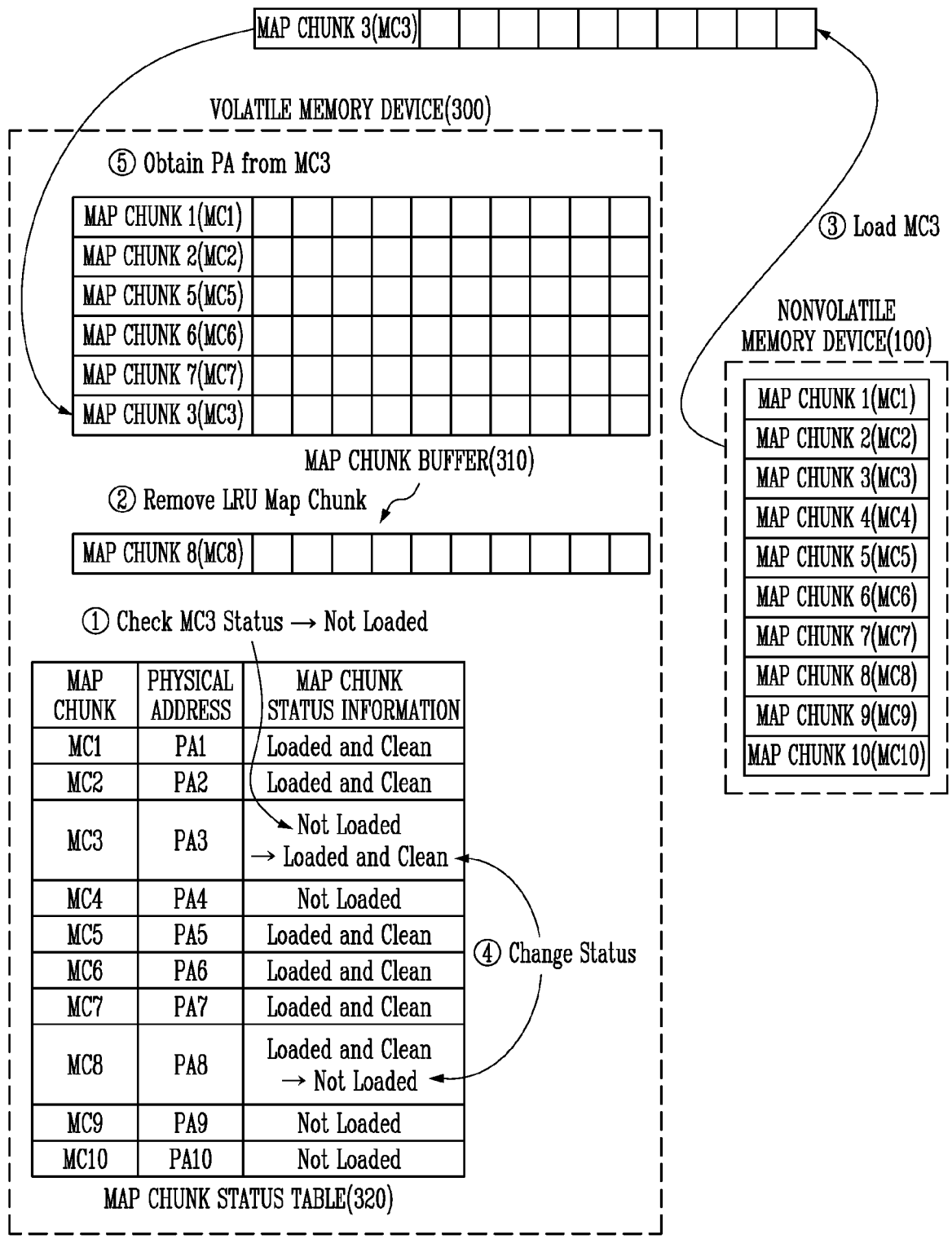
FIG. 8 is a diagram illustrating a method of managing a map chunk buffer of a storage device according to an embodiment of the present disclosure.

FIG. 8 is a diagram illustrating a method of managing a map chunk buffer of a storage device according to an embodiment of the present disclosure.

FIG. 8 illustrates a status after the map data is updated according to the embodiment of FIG. 7.

Referring to FIGS. 1, 7 and 8, the map chunk buffer 310 may temporarily store the map chunk 1 MC1, the map chunk 2 MC2, the map chunk 5 MC5, the map chunk 6 MC6, the map chunk 7 MC7, and the map chunk 8 MC8, and statuses thereof may be the clean status (Loaded and Clean).

According to an embodiment of the present disclosure, the memory controller 200 may not immediately evict the updated map data from the map chunk buffer 310 after storing the updated map data in the nonvolatile memory device 100 and may maintain the updated map data as the clean status (Loaded and Clean) in the map chunk buffer 310. It is not necessary to remove the map chunks of the clean status (Loaded and Clean) in a state in which the read operation may be requested, and this may help performance improvement of a random read.

In FIG. 8, the host may provide the read request. In FIG. 8, the read-requested logical address corresponds to the map entry included in the map chunk 3 MC3.

The memory controller 200 may check the map chunk status table 320 and confirm that the map chunk 3 MC3 is in the non-stored status (Not Loaded) (① Check MC3 Status→Not Loaded). Thereafter, the memory controller 200 may check whether a residual space for loading the map chunk exists in the map chunk buffer 310. Since the residual space does not exist, the memory controller 200 may remove one map chunk among the map chunk 1 MC1, the map chunk 2 MC2, the map chunk 5 MC5, the map chunk 6 MC6, the map chunk 7 MC7, and the map chunk 8 MC8 from the map chunk buffer 310. At this time, the memory controller 200 may remove the least recently used (LRU) map chunk (② Remove LRU Map Chunk).

The memory controller 200 may load the map chunk 3 MC3 among the plurality of map chunks MC1 to MC10, which are stored in the nonvolatile memory device 100, in the map chunk buffer 310 (③ Load MC3).

The memory controller 200 may change the status of the map chunk 3 MC3 of the map chunk status table 320 from the non-stored status (Not Loaded) to the clean status (Loaded and Clean), and conversely, the memory controller 200 may change the status of the map chunk 8 MC8 from the clean status (Loaded and Clean) to the non-stored status (Not Loaded) (④ Change Status).

The memory controller 200 may obtain a physical address corresponding to the read-requested logical address from the map chunk 3 MC3 temporarily stored in the map chunk buffer 310 (⑤ Obtain PA from MC3).

Figure 9:
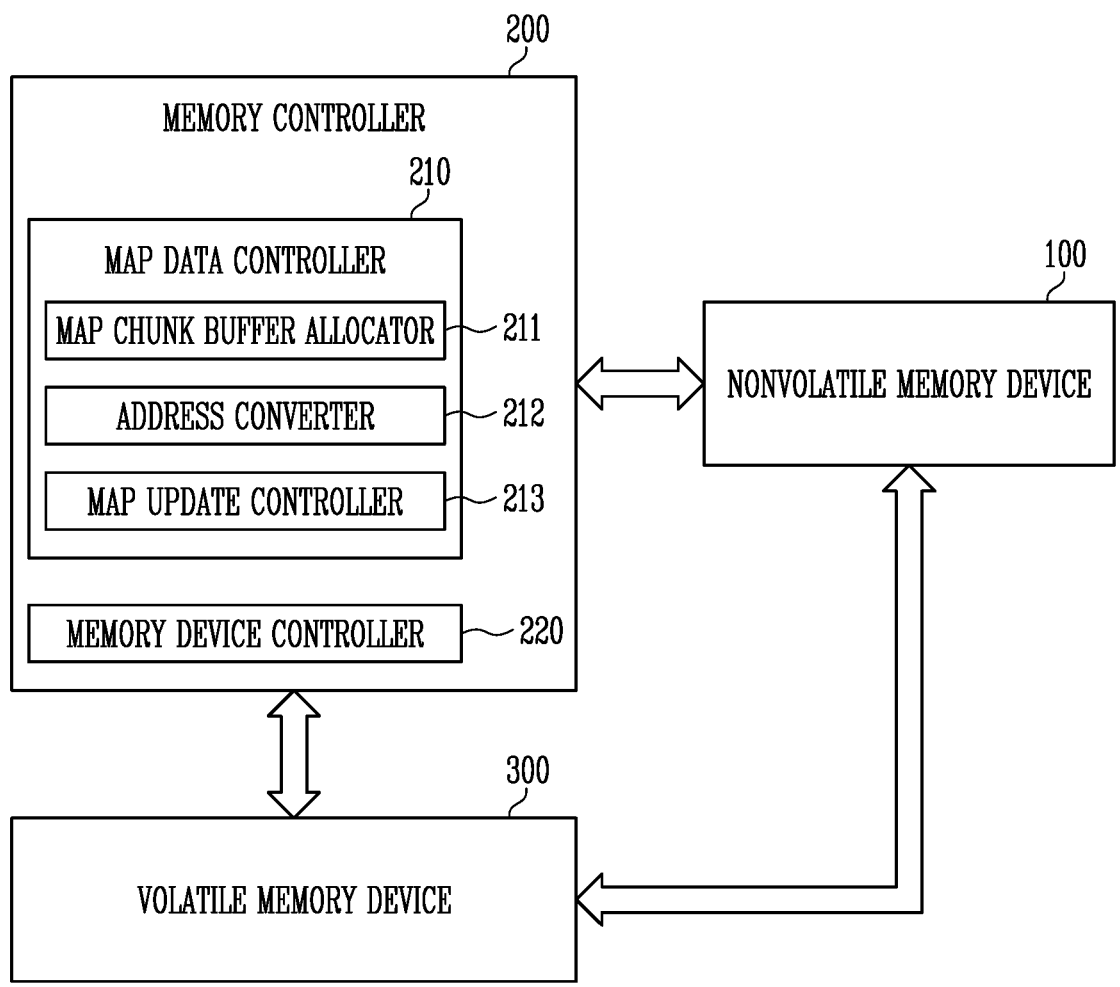
FIG. 9 is a block diagram illustrating a structure of a memory controller according to an embodiment of the present disclosure.

FIG. 9 is a block diagram illustrating a structure of a memory controller according to an embodiment of the present disclosure.

Referring to FIGS. 1 and 9, the storage device 50 may include the nonvolatile memory device 100, the memory controller 200, and the volatile memory device 300.

The memory controller 200 may include the map data controller 210 and a memory device controller 220. The map data controller 210 may include a map chunk buffer allocator 211, an address converter 212, and a map update controller 213. The memory device controller 220 is configured to control the nonvolatile memory device 100 to store write data corresponding to a write request in a position indicated by a physical address within the nonvolatile memory device 100.

The map data controller 210 may control the nonvolatile memory device 100 and the volatile memory device 300 to update the map entry included in the map chunk loaded in the map chunk buffer 310 and store the map chunk including the updated map entry in the nonvolatile memory device 100.

When the write request is input, the address converter 212 may allocate a physical address for storing data corresponding to the write-requested logical address into the nonvolatile memory device 100. The map chunk buffer allocator 211 may read the map chunk including the map entry corresponding to the write-requested logical address from the nonvolatile memory device 100, and allocate a space in the map chunk buffer 310 for temporarily storing the read map chunk.

When the map entry corresponding to the write-requested logical address is updated in the map chunk buffer 310, the map update controller 213 generates a journal entry including update information on the map entry corresponding to the write-requested logical address. The map update controller 213 may store the generated journal entry in the journal buffer 330. Here, the number of journal entries that may be stored in the journal buffer 330 may be the same as the number of map chunks of the dirty status that may be stored in the map chunk buffer 310. Thereafter, the map update controller 213 may change the status information of the map chunk corresponding to the write-requested logical address within the map chunk status table 320 to the dirty status.

When the preset number of the journal entries are stored in the journal buffer 330, the map update controller 213 may obtain the map chunks corresponding to the journal entries from the nonvolatile memory device 100 and store the map chunks in the meta slice buffer 340. The map update controller 213 may update the map chunks stored in the meta slice buffer 340 using the map chunks temporarily stored in the map chunk buffer 310, and store the updated map chunks and journal entries in the nonvolatile memory device 100. Thereafter, the map update controller 213 may change the status information of the updated map chunks to the clean status.

Figure 10:
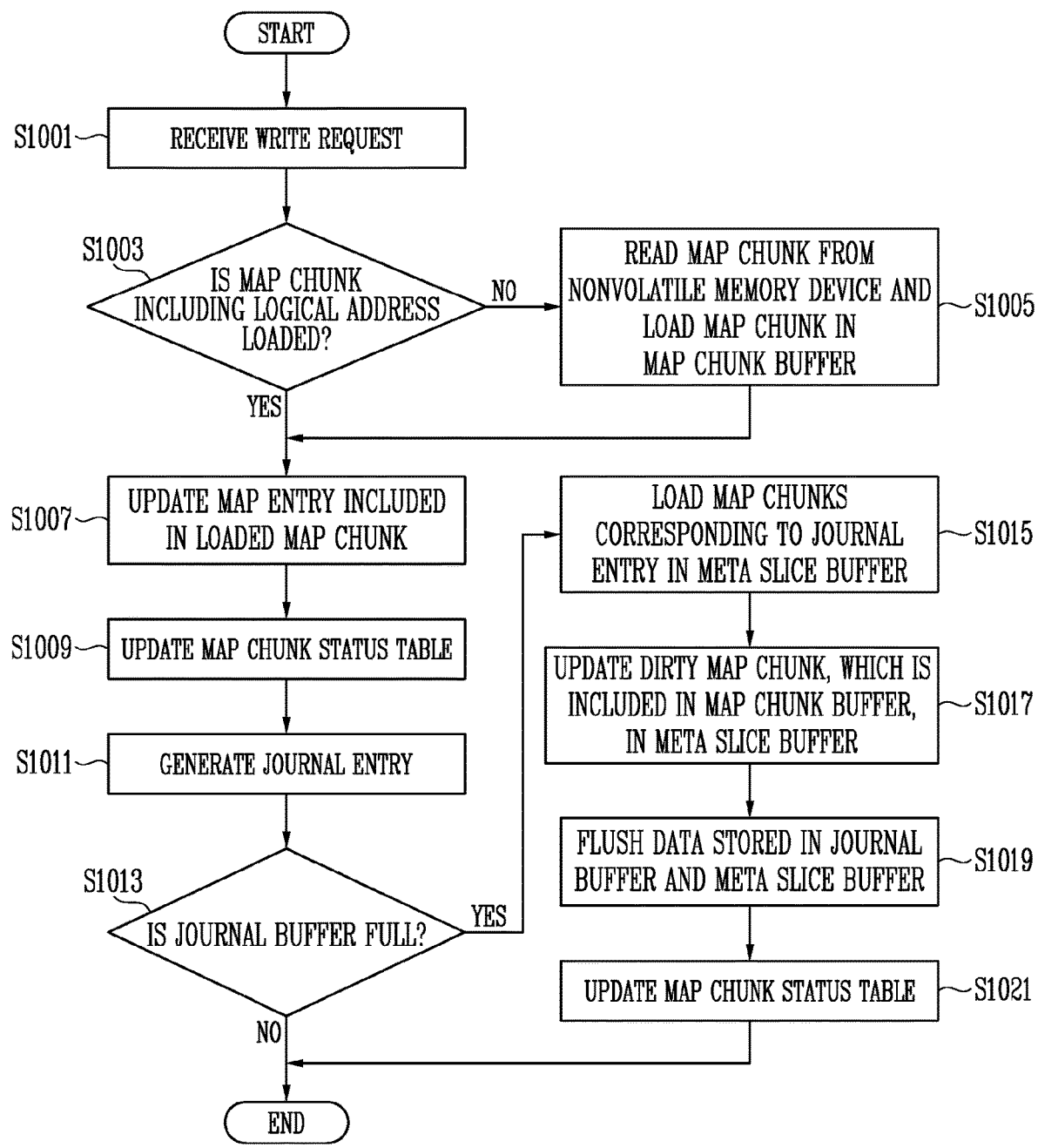
FIG. 10 is a flowchart illustrating a method of operating a storage device according to an embodiment of the present disclosure.

FIG. 10 is a flowchart illustrating a method of operating a storage device according to an embodiment of the present disclosure.

Referring to FIG. 10, in operation S1001, the storage device may receive the write request.

In operation S1003, it may be determined whether the map chunk including the write-requested logical address is stored in the volatile memory device. As a result of the determination, when the map chunk including the write-requested logical address is stored in the volatile memory device, the method proceeds to operation S1007, otherwise the method proceeds to operation S1005.

In operation S1005, the storage device may read the map chunk including the write-requested logical address from the nonvolatile memory device and store the map chunk including the write-requested logical address in the map chunk buffer.

In operation S1007, the storage device may update the map entry included in the loaded map chunk. The update of the map entry may be changing the physical address before the update to the physical address after the update.

In operation S1009, the storage device may change the status of the map chunk stored in the map chunk status table to the dirty status.

In operation S1011, the storage device may generate the journal entry corresponding to the updated map entry. The journal entry may include the physical address before the update of the map entry corresponding to the write-requested logical address and the physical address after the update the map entry corresponding of the write-requested logical address.

In operation S1013, the storage device may determine whether the journal buffer is full (i.e., whether the number of journal entries stored in the journal buffer 330 reaches the preset number). When a residual space exists in the journal buffer (i.e., when the number of journal entries stored in the journal buffer 330 does not yet reach the preset number), since the map update is not required to be performed, the method is ended. When the journal buffer is full (i.e., when the number of journal entries stored in the journal buffer 330 reaches the preset number), operations S1015 to S1021 may be performed to perform the map update.

In operation S1015, the storage device may read the map chunks corresponding to the journal entry from the nonvolatile memory device again, and load the map chunks in the meta slice buffer.

In operation S1017, the storage device may update the map chunks stored in the meta slice buffer by using the map chunks of the dirty status included in the map chunk buffer.

In operation S1019, the storage device may perform a flush operation of storing the journal data, which is stored in the journal buffer, and the data, which is stored in the meta slice buffer, in the nonvolatile memory device.

In operation S1021, the storage device may update the status of the updated map chunk stored in the map chunk status table to the clean status.

Figure 11:
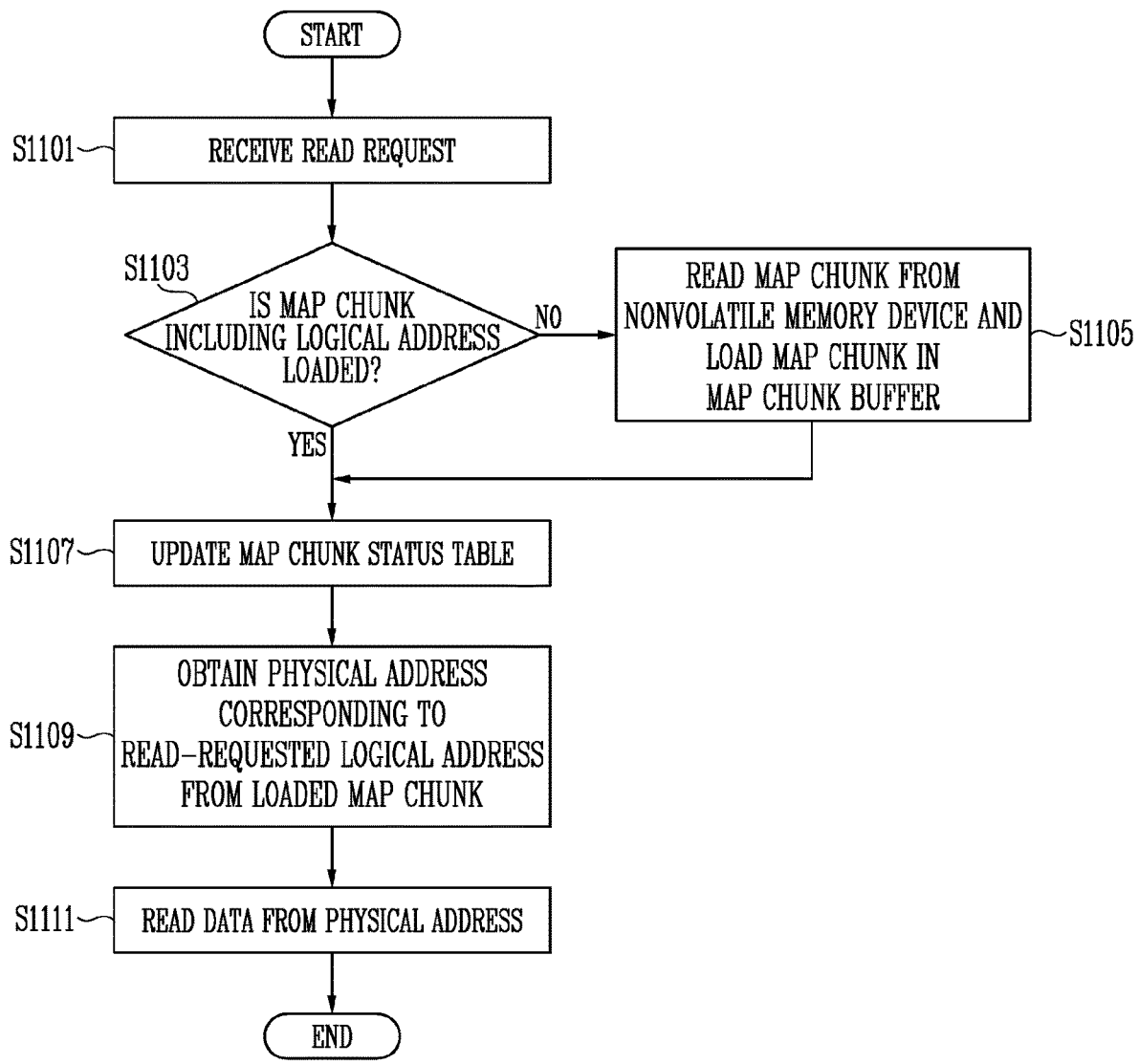
FIG. 11 is a flowchart illustrating a method of operating a storage device according to an embodiment of the present disclosure.

FIG. 11 is a flowchart illustrating a method of operating a storage device according to an embodiment of the present disclosure.

Referring to FIG. 11, in operation S1101, the storage device may receive the read request from the host.

In operation S1103, the storage device may determine whether the map chunk including the read-requested logical address is stored in the map chunk buffer. As a result of the determination, when the map chunk including the read-requested logical address is stored in the map chunk buffer included in the volatile memory device, the method proceeds to operation S1107, otherwise the method proceeds to operation S1105.

In operation S1105, the storage device may read the map chunk including the read-requested logical address from the nonvolatile memory device and store the map chunk in the map chunk buffer.

In operation S1107, the storage device may change the status of the map chunk stored in the map chunk status table to the clean status.

In operation S1109, the storage device may obtain the physical address corresponding to the read-requested logical address from the loaded map chunk.

In operation S1111, the storage device may read the data stored in the obtained physical address.

Figure 12:
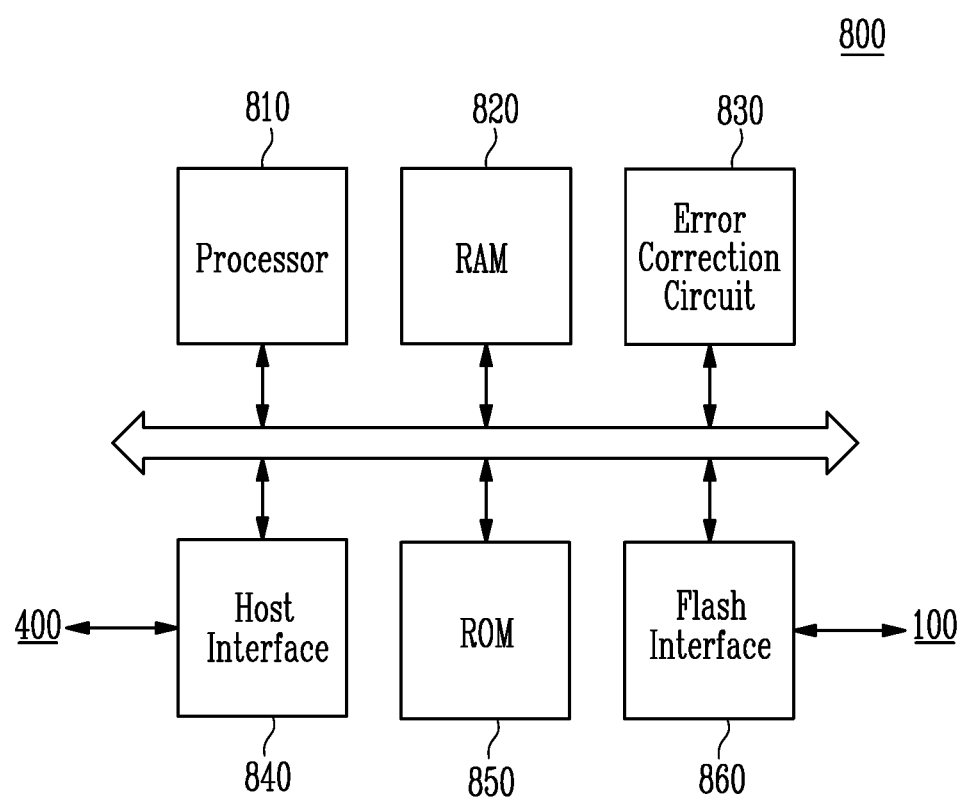
FIG. 12 is a diagram illustrating another embodiment of a memory controller of FIG. 1.

FIG. 12 is a diagram illustrating another embodiment of the memory controller of FIG. 1.

Referring to FIG. 12, the memory controller 800 may include a processor 810, a RAM 820, an error correction circuit 830, a host interface 840, a ROM 850, and a flash interface 860.

The processor 810 may control an overall operation of the memory controller 800. The RAM 820 may be used as a buffer memory, a cache memory, an operation memory, and the like of the memory controller 800. For example, the map data controller 210 described with reference to FIG. 1 may be stored in the RAM 820 or the ROM 850 in a form of software included in firmware executed by the processor 810.

The ROM 850 may store various pieces of information in a firmware form required for the memory controller 800 to operate.

The memory controller 800 may communicate with an external device (for example, the host 400, an application processor, and the like) through the host interface 840.

The memory controller 800 may communicate with the nonvolatile memory device 100 through the flash interface 860. The memory controller 800 may transmit a command CMD, an address ADDR, a control signal CTRL, and the like to the nonvolatile memory device 100 and receive data DATA through the flash interface 860. For example, the flash interface 860 may include a NAND interface.

Figure 13:
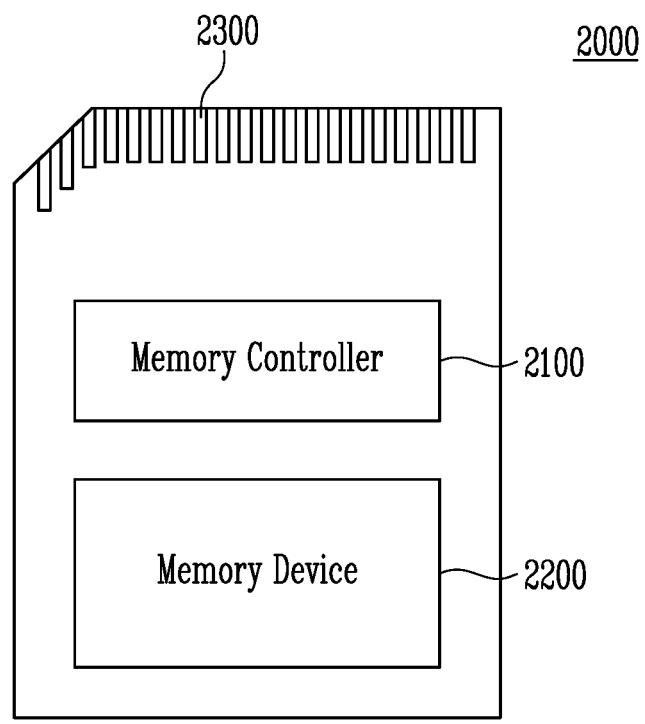
FIG. 13 is a block diagram illustrating a memory card system to which a storage device according to an embodiment of the present disclosure is applied.

FIG. 13 is a block diagram illustrating a memory card system to which a storage device according to an embodiment of the present disclosure is applied.

Referring to FIG. 13, the memory card system 2000 includes a memory controller 2100, a memory device 2200, and a connector 2300.

The memory controller 2100 is connected to the memory device 2200. The memory controller 2100 is configured to access the memory device 2200. For example, the memory controller 2100 may be configured to control read, program, erase, and background operations of the memory device 2200. The memory controller 2100 is configured to provide an interface between the memory device 2200 and a host. The memory controller 2100 is configured to drive firmware for controlling the memory device 2200. The memory controller 2100 may be implemented identically to the memory controller 200 described with reference to FIG. 1.

For example, the memory controller 2100 may include components such as a random access memory (RAM), a processor, a host interface, a memory interface, and an error corrector.

The memory controller 2100 may communicate with an external device through the connector 2300. The memory controller 2100 may communicate with an external device (for example, the host) according to a specific communication standard. For example, the memory controller 2100 is configured to communicate with an external device through at least one of various communication standards such as a universal serial bus (USB), a multimedia card (MMC), an embedded MMC (eMMC), a peripheral component interconnection (PCI), a PCI express (PCI-E), an advanced technology attachment (ATA), a serial-ATA, a parallel-ATA, a small computer system interface (SCSI), an enhanced small disk interface (ESDI), integrated drive electronics (IDE), FireWire, a universal flash storage (UFS), Wi-Fi, Bluetooth, and an NVMe. For example, the connector 2300 may be defined by at least one of the various communication standards described above.

For example, the memory device 2200 may be configured of various nonvolatile memory elements such as an electrically erasable and programmable ROM (EEPROM), a NAND flash memory, a NOR flash memory, a phase-change RAM (PRAM), a resistive RAM (ReRAM), a ferroelectric RAM (FRAM), and a spin transfer torque magnetic RAM (STT-MRAM).

The memory controller 2100 and the memory device 2200 may be integrated into one semiconductor device to configure a memory card. For example, the memory controller 2100 and the memory device 2200 may be integrated into one semiconductor device to configure a memory card such as a PC card (personal computer memory card international association (PCMCIA)), a compact flash card (CF), a smart media card (SM or SMC), a memory stick, a multimedia card (MMC, RS-MMC, MMCmicro, or eMMC), an SD card (SD, miniSD, microSD, or SDHC), and a universal flash storage (UFS).

Figure 14:
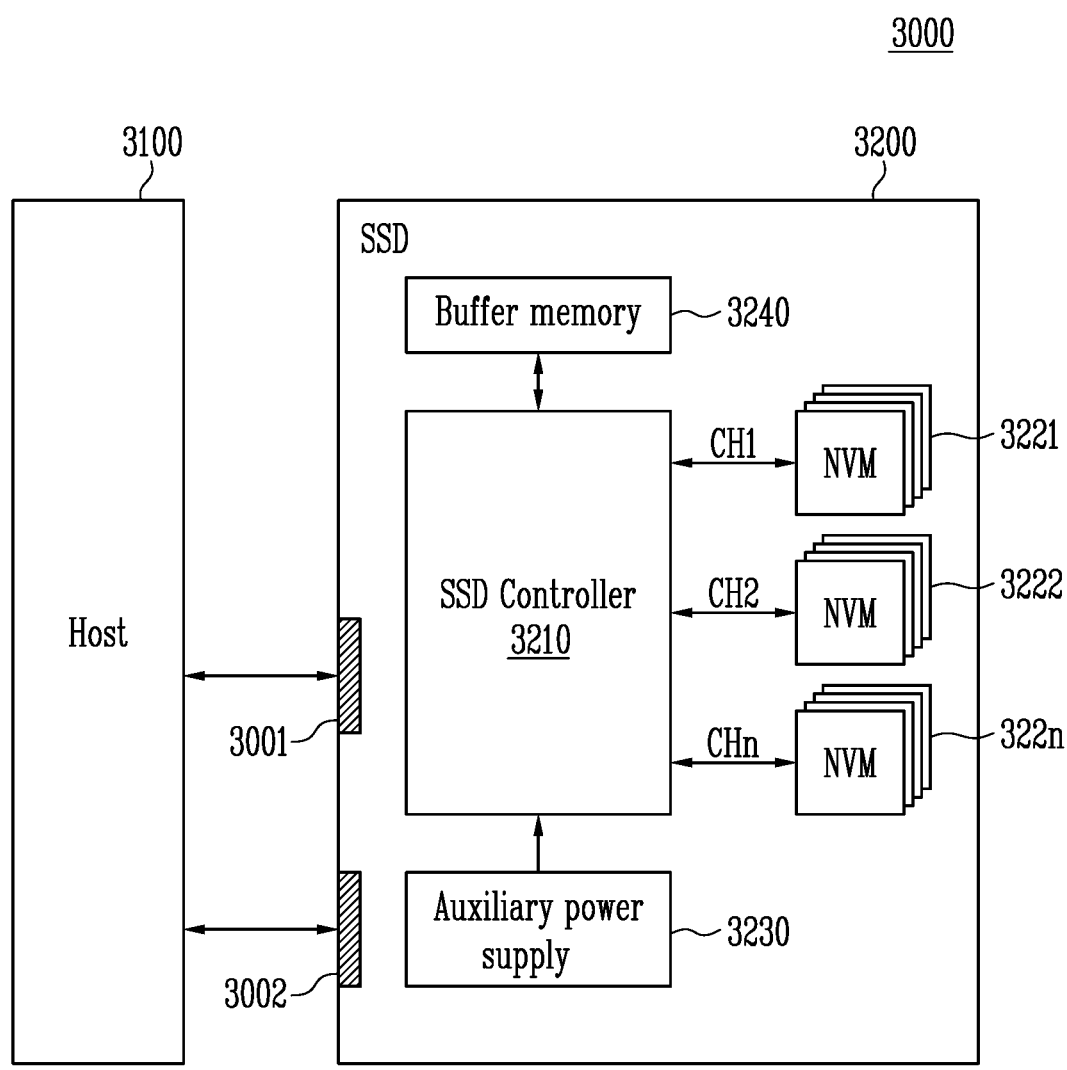
FIG. 14 is a block diagram illustrating a solid state drive (SSD) system to which a storage device according to an embodiment of the present disclosure is applied.

FIG. 14 is a block diagram illustrating a solid state drive (SSD) system to which a storage device according to an embodiment of the present disclosure is applied.

Referring to FIG. 14, the SSD system 3000 includes a host 3100 and an SSD 3200. The SSD 3200 exchanges a signal with the host 3100 through a signal connector 3001 and receives power through a power connector 3002. The SSD 3200 includes an SSD controller 3210, a plurality of flash memories 3221 to 322n, an auxiliary power supply 3230, and a buffer memory 3240.

According to an embodiment of the present disclosure, the SSD controller 3210 may perform the function of the memory controller 200 described with reference to FIG. 1.

The SSD controller 3210 may control the plurality of flash memories 3221 to 322n in response to the signal received from the host 3100. For example, the signal may be signals based on an interface between the host 3100 and the SSD 3200. For example, the signal may be a signal defined by at least one of interfaces such as a universal serial bus (USB), a multimedia card (MMC), an embedded MMC (eMMC), a peripheral component interconnection (PCI), a PCI express (PCI-E), an advanced technology attachment (ATA), a serial-ATA, a parallel-ATA, a small computer system interface (SCSI), an enhanced small disk interface (ESDI), integrated drive electronics (IDE), FireWire, a universal flash storage (UFS), Wi-Fi, Bluetooth, and an NVMe.

The auxiliary power supply 3230 is connected to the host 3100 through the power connector 3002. The auxiliary power supply 3230 may receive the power from the host 3100 and may charge the power. The auxiliary power supply 3230 may provide power of the SSD 3200 when power supply from the host 3100 is not smooth. For example, the auxiliary power supply 3230 may be positioned in the SSD 3200 or may be positioned outside the SSD 3200. For example, the auxiliary power supply 3230 may be positioned on a main board and may provide auxiliary power to the SSD 3200.

The buffer memory 3240 operates as a buffer memory of the SSD 3200. For example, the buffer memory 3240 may temporarily store data received from the host 3100 or data received from the plurality of flash memories 3221 to 322n, or may temporarily store metadata (for example, a mapping table) of the flash memories 3221 to 322n. The buffer memory 3240 may include a volatile memory such as a DRAM, an SDRAM, a DDR SDRAM, an LPDDR SDRAM, and a GRAM, or a nonvolatile memory such as an FRAM, a ReRAM, an STT-MRAM, and a PRAM.

Figure 15:
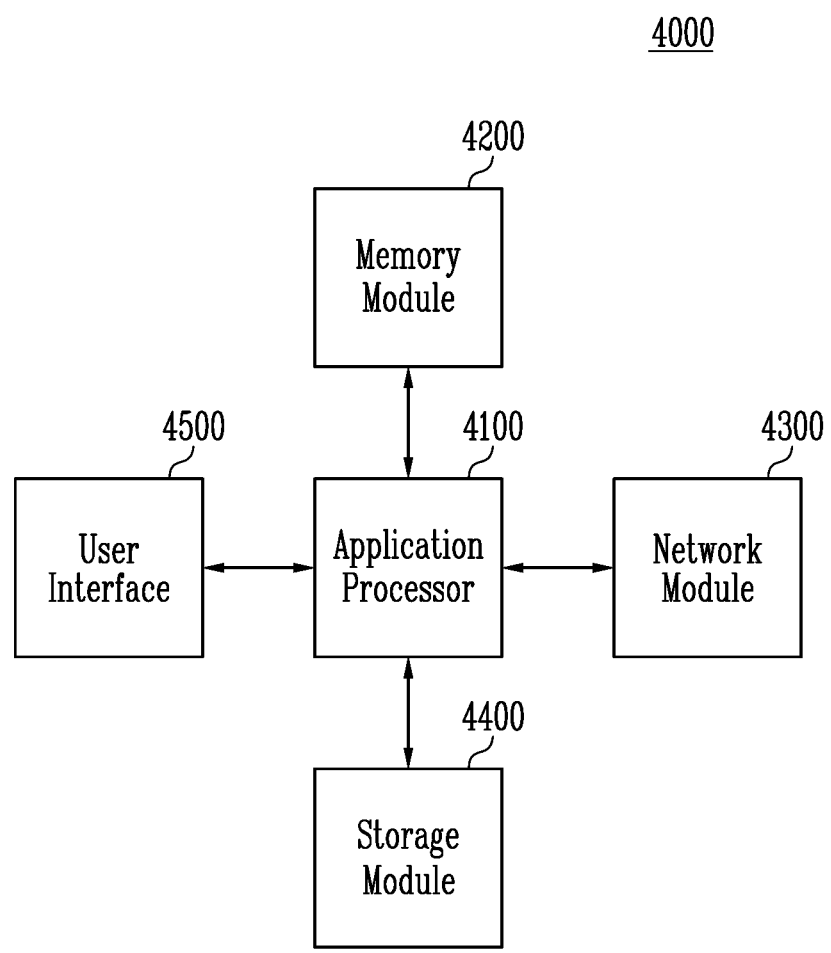
FIG. 15 is a block diagram illustrating a user system to which a storage device according to an embodiment of the present disclosure is applied.

FIG. 15 is a block diagram illustrating a user system to which a storage device according to an embodiment of the present disclosure is applied.

Referring to FIG. 15, the user system 4000 includes an application processor 4100, a memory module 4200, a network module 4300, a storage module 4400, and a user interface 4500.

The application processor 4100 may drive components, an operating system (OS), a user program, or the like included in the user system 4000. For example, the application processor 4100 may include controllers, interfaces, graphics engines, and the like that control the components included in the user system 4000. The application processor 4100 may be provided as a system-on-chip (SoC).

The memory module 4200 may operate as a main memory, an operation memory, a buffer memory, or a cache memory of the user system 4000. The memory module 4200 may include a volatile random access memory such as a DRAM, an SDRAM, a DDR SDRAM, a DDR2 SDRAM, a DDR3 SDRAM, an LPDDR SDRAM, an LPDDR2 SDRAM, and an LPDDR3 SDRAM, or a nonvolatile random access memory, such as a PRAM, a ReRAM, an MRAM, and an FRAM. For example, the application processor 4100 and memory module 4200 may be packaged based on a package on package (POP) and provided as one semiconductor package.

The network module 4300 may communicate with external devices. For example, the network module 4300 may support wireless communication such as code division multiple access (CDMA), global system for mobile communications (GSM), wideband CDMA (WCDMA), CDMA-2000, time division multiple access (TDMA), long term evolution, Wimax, WLAN, UWB, Bluetooth, and Wi-Fi. For example, the network module 4300 may be included in the application processor 4100.

The storage module 4400 may store data. For example, the storage module 4400 may store data received from the application processor 4100. Alternatively, the storage module 4400 may transmit data stored in the storage module 4400 to the application processor 4100. For example, the storage module 4400 may be implemented with a nonvolatile semiconductor memory element such as a phase-change RAM (PRAM), a magnetic RAM (MRAM), a resistive RAM (RRAM), a NAND flash, a NOR flash, and a three-dimensional NAND flash. For example, the storage module 4400 may be provided as a removable storage device (removable drive), such as a memory card, and an external drive of the user system 4000.

For example, the storage module 4400 may include a plurality of nonvolatile memory devices, and the plurality of nonvolatile memory devices may operate identically to the nonvolatile memory device 100 described with reference to FIG. 1. The storage module 4400 may operate identically to the storage device 50 described with reference to FIG. 1.

The user interface 4500 may include interfaces for inputting data or an instruction to the application processor 4100 or for outputting data to an external device. For example, the user interface 4500 may include user input interfaces such as a keyboard, a keypad, a button, a touch panel, a touch screen, a touch pad, a touch ball, a camera, a microphone, a gyroscope sensor, a vibration sensor, and a piezoelectric element. The user interface 4500 may include user output interfaces such as a liquid crystal display (LCD), an organic light emitting diode (OLED) display device, an active matrix OLED (AMOLED) display device, an LED, a speaker, and a monitor.

Various embodiments of the present disclosure have been described in the drawings and specification. Although specific terminologies are used here, the terminologies are used only to describe the embodiments of the present disclosure. Therefore, the present disclosure is not restricted to the above-described embodiments and many variations are possible within the spirit and scope of the present disclosure. It should be apparent to those skilled in the art that various modifications can be made on the basis of the technological scope of the present disclosure in addition to the embodiments disclosed herein. Additions, subtractions, or modifications which are apparent in view of the present disclosure are intended to fall within the scope of the appended claims.

What is claimed is:

1. A storage device comprising:
    a nonvolatile memory device configured to store meta slices each including a plurality of map chunks including map data having logical addresses provided by a host and physical addresses indicating a position where data corresponding to the logical addresses is stored;
    a volatile memory device including a map chunk buffer that temporarily stores some of the plurality of map chunks, and a map chunk status table that stores map chunk status information indicating whether each of the plurality of map chunks stored in the nonvolatile memory device is temporarily stored in the map chunk buffer; and
    a memory controller configured to control the nonvolatile memory device and the volatile memory device to load a map chunk in which a write-requested logical address is included in the map chunk buffer among the plurality of map chunks stored in the nonvolatile memory device, to update the map chunk, and to store the map chunk status information indicating that the map chunk in which the write-requested logical address is included is loaded in the map chunk buffer, in response to a write request input from the host,
    wherein the volatile memory device further comprises a journal buffer that stores a journal entry including an updated map entry included in the map chunk temporarily stored in the map chunk buffer, wherein one journal entry is stored in the journal buffer when one map chunk stored in the map chunk buffer is updated, and
    wherein the memory controller, when a preset number of journal entries are stored in the journal buffer according to the write request from the host, acquires a meta slice including map chunks corresponding to the journal entries, respectively, from the nonvolatile memory device, updates the map chunks included in the meta slice based on updated map chunks stored in the map chunk buffer, and provides the map chunks included in the meta slice and the journal entries to the nonvolatile memory device.

2. The storage device of claim 1, wherein the memory controller comprises:
    a map data controller configured to control the nonvolatile memory device and the volatile memory device to update a map entry among a plurality of map entries included in the map chunk in which the write-requested logical address is included and to store the map chunk including the updated map entry in the nonvolatile memory device; and
    a memory device controller configured to control the nonvolatile memory device to store write data corresponding to the write request in a position indicated by a physical address within the nonvolatile memory device.

3. The storage device of claim 2, wherein the map data controller comprises:
    an address converter configured to allocate the physical address corresponding to the write-requested logical address and indicating the position to store the write data; and
    a map chunk buffer allocator configured to allocate an area in the map chunk buffer, in which the map chunk in which the write-requested logical address is included, is to be loaded.

4. The storage device of claim 3,
    wherein the map data controller further comprises a map update controller that generates the journal entry including the updated map entry and stores the journal entry in the journal buffer, when the map entry corresponding to the write-requested logical address among the plurality of map entries included in the map chunk loaded in the map chunk buffer, is updated.

5. The storage device of claim 4, wherein a number of journal entries stored in the journal buffer is the same as a number of map chunks stored in the map chunk buffer.

6. The storage device of claim 4, wherein the map update controller changes the map chunk status information of the map chunk in which the write-requested logical address is included within the map chunk status table to a dirty status indicating that the map chunk in which the write-requested logical address is included is loaded in the map chunk buffer and updated.

7. The storage device of claim 4,
wherein the memory controller is further configured to update the plurality of map chunks stored in the nonvolatile memory device in units of the meta slices, each of the meta slices including a preset number of map chunks, and
wherein the volatile memory device further comprises a meta slice buffer that temporarily stores map chunks to be updated among the plurality of map chunks stored in the nonvolatile memory device.

8. The storage device of claim 7, wherein the map update controller controls the nonvolatile memory device and the volatile memory device to obtain the map chunks corresponding to the journal entries from the nonvolatile memory device and store the map chunks corresponding to the journal entries in the meta slice buffer, when the preset number of the journal entries are stored in the journal buffer.

9. The storage device of claim 8, wherein the map update controller controls the nonvolatile memory device and the volatile memory device to update the map chunks stored in the meta slice buffer using the map chunks temporarily stored in the map chunk buffer and to store updated map chunks and the journal entries in the nonvolatile memory device.

10. The storage device of claim 9, wherein the map update controller changes the map chunk status information of the updated map chunks within the map chunk status table to a clean status indicating that the updated map chunks are loaded in the map chunk buffer and are the same data as the map chunks stored in the nonvolatile memory device.

11. The storage device of claim 4, wherein the journal entry includes a previous physical address that is a physical address before update of the map entry corresponding to the write-requested logical address and an updated physical address that is a physical address after the update of the map entry corresponding to the write-requested logical address.

12. The storage device of claim 1, wherein the volatile memory device includes at least one of a dynamic random access memory or a static random access memory.

13. A storage device comprising:
a nonvolatile memory device configured to store meta slices each including a plurality of map chunks including map data having logical addresses provided by a host and physical addresses indicating a position where data corresponding to the logical addresses is stored;
a map chunk buffer configured to temporarily store a map chunk changed to a dirty status in response to a write request from the host among the plurality of map chunks stored in the nonvolatile memory device;
a map chunk status table configured to store map chunk status information indicating whether each of the plurality of map chunks stored in the nonvolatile memory device is temporarily stored in the map chunk buffer;
a journal buffer configured to store a journal entry including information on an updated map entry among a plurality of map entries included in the map chunk temporarily stored in the map chunk buffer in response to the write request from the host, wherein one journal entry is stored in the journal buffer when one map chunk stored in the map chunk buffer is updated;
a meta slice buffer configured to temporarily store a meta slice including map chunks corresponding to journal entries, respectively, read from the nonvolatile memory device when a preset number of the journal entries are stored in the journal buffer; and
a memory controller configured to update the map chunks stored in the meta slice buffer based on map chunks stored in the map chunk buffer, and provide the map chunks stored in the meta slice buffer and the journal entries to the nonvolatile memory device,
wherein a number of the journal entries to be stored in the journal buffer is the same as a number of map chunks to be stored in the map chunk buffer.

14. The storage device of claim 13, wherein the memory controller is configured to control the nonvolatile memory device and a volatile memory device to load a map chunk in which a read-requested logical address is included in the map chunk buffer among the plurality of map chunks stored in the nonvolatile memory device, and to store the map chunk status information indicating that the map chunk in which the read-requested logical address is included is loaded in the map chunk buffer in the map chunk status table according to whether the map chunk in which the read-requested logical address is included among the plurality of map chunks stored in the nonvolatile memory device is temporarily stored in the map chunk buffer, in response to a read request input from the host.

15. The storage device of claim 13, wherein the map chunk status information of a corresponding map chunk is one of the dirty status indicating that the corresponding map chunk is temporarily stored in the map chunk buffer and is updated, a clean status indicating that the corresponding map chunk is temporarily stored in the map chunk buffer and is not updated, and a non-stored status indicating that the corresponding map chunk is not temporarily stored in the map chunk buffer.

16. The storage device of claim 15, wherein the memory controller stores the journal entry and the meta slice respectively stored in the journal buffer and the meta slice buffer in the nonvolatile memory device, and then updates the map chunk status information of the map chunk temporarily stored in the map chunk buffer and corresponding to the journal entry stored in the journal buffer.

17. The storage device of claim 13, wherein the map chunk status information further includes physical addresses indicating positions where the plurality of map chunks are stored in the nonvolatile memory device.

18. The storage device of claim 13, wherein the journal entry includes a previous physical address that is a physical address before update of the updated map entry, and an updated physical address that is a physical address after the update of the updated map entry.

19. The storage device of claim 13,
wherein each of the plurality of map chunks includes a plurality of map entries, and
wherein each of the plurality of map entries includes mapping information of one logical address.

20. The storage device of claim 13,
wherein the map chunk buffer, the map chunk status table, the journal buffer, and the meta slice buffer are included in a volatile memory device, and
wherein the volatile memory device includes at least one of a dynamic random access memory or a static random access memory.

* * * * *